US007953618B2

(12) United States Patent
Pearce et al.

(10) Patent No.: US 7,953,618 B2
(45) Date of Patent: May 31, 2011

(54) TRANSPORT SYSTEM

(76) Inventors: John H Pearce, Auckland (NZ); Paul Minett, Auckland (NZ)

( * ) Notice: Subject to any disclaimer, the term of this patent is extended or adjusted under 35 U.S.C. 154(b) by 995 days.

(21) Appl. No.: 11/517,504

(22) Filed: Sep. 8, 2006

(65) Prior Publication Data
US 2007/0027825 A1 Feb. 1, 2007

Related U.S. Application Data

(63) Continuation-in-part of application No. PCT/NZ2005/000037, filed on Mar. 3, 2005.

(30) Foreign Application Priority Data

Mar. 10, 2004 (NZ) ........................................ 531675

(51) Int. Cl.
G06Q 99/00 (2006.01)
(52) U.S. Cl. .......................... 705/6; 705/9; 705/8; 705/5
(58) Field of Classification Search .................... 705/13, 705/1, 5, 6, 8, 9
See application file for complete search history.

(56) References Cited

U.S. PATENT DOCUMENTS

| | | | | |
|---|---|---|---|---|
| 4,360,875 A | * | 11/1982 | Behnke | 455/456.5 |
| 5,168,451 A | * | 12/1992 | Bolger | 701/117 |
| 5,751,973 A | * | 5/1998 | Hassett | 705/13 |
| 6,697,730 B2 | | 2/2004 | Dickerson | 701/200 |
| 2001/0037174 A1 | * | 11/2001 | Dickerson | 701/200 |
| 2002/0052751 A1 | * | 5/2002 | Ebata | 705/1 |
| 2004/0158483 A1 | * | 8/2004 | Lecouturier | 705/6 |
| 2004/0266457 A1 | * | 12/2004 | Dupray | 455/456.5 |
| 2005/0099320 A1 | * | 5/2005 | Nath et al. | 340/933 |
| 2005/0280555 A1 | * | 12/2005 | Warner, IV | 340/932.2 |

FOREIGN PATENT DOCUMENTS

NZ 1001830 8/1997

OTHER PUBLICATIONS

Metro Opens Dorrs, Southern Avenue Metro Station Bus lot layout, http://web.archive.org/web/20010405075106/www.wmata.com/metrorail/Stations/southern_st.htm.*
UBD Sydney 2000 Prof. Drivers, 36th Ed., Pub. 1999, Domestic Terminal and International terminal, Map 278.
Mid-American Regional Council Ride Share Program Website, http://www.marc.org/rideshare, Sep. 3, 2003, pp. 1-2. Metro Commuter Services website, Jan. 23, 2003, pp. 1-2, http://www.metrocommuterservices.org.
Sluglines.com website, http://www.slug-lines.com, pp. 1-2, Dec. 21, 2003.
Niles et al. "IVHS Technology for Improving Ride Sharing," Proceedings of the 1992 Annual Meeting of IVHS America, New Port Beach, CA, May 1992.

* cited by examiner

Primary Examiner — Akiba K Robinson Boyce
(74) Attorney, Agent, or Firm — Novak, Druce, Quigg LLP

(57) ABSTRACT

A transport system having
commuters with identification and/or vehicles with identification ("identifiers") authorizing them to take part in the transport system,
at least one vehicle park in which authorized commuters may park vehicles and/or take on board authorized commuters who may or may not have parked vehicles and transport them to a specified destination and/or for set down near the specified destination,
a hub at which vehicles of authorized commuters or others may take on board authorized commuters and transport them to the or a said vehicle park,
optionally near the specified destination, at least one pickup point from which authorized commuters may be transported back to the hub, and
a benefit sharing system involving the use of the identifiers at the vehicle park(s) and/or said hub whereby an authorized commuter, when a driver of authorized commuter(s) leaving and/or returning to or arriving at the vehicle park(s) and/or hub, benefits at some detriment to each carried commuter.

26 Claims, 9 Drawing Sheets

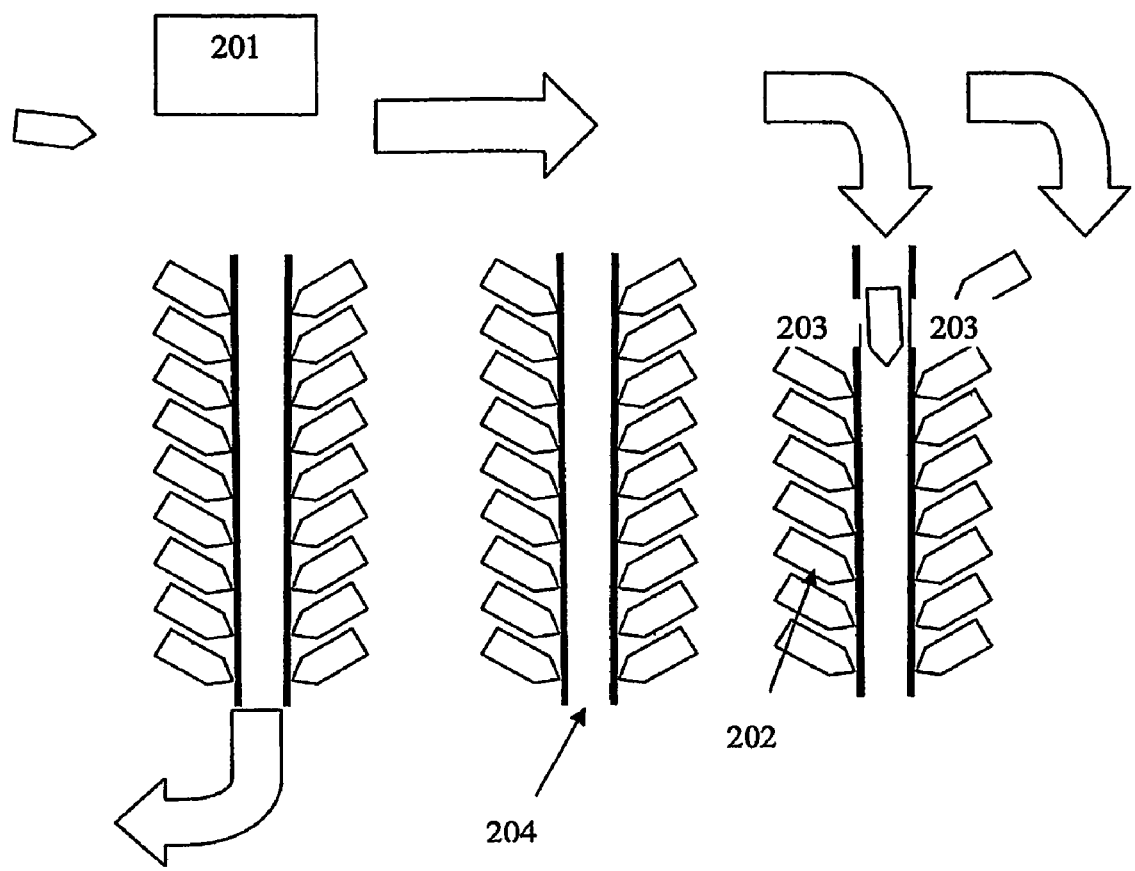

Benefit Sharing System Flow Chart Morning Processes

Detail of Exit Layby

Benefit Sharing System Evening Processes

TRANSPORT SYSTEM

This is a Continuation-in-Part of PCT/NZ2005/000037 filed 3 Mar. 2005 and published in English.

FIELD OF THE INVENTION

This invention relates to a transport system utilising vehicle pooling, that is, a system whereby passengers whose routes converge share vehicles on a facilitated but not pre-committed basis.

BACKGROUND OF THE INVENTION

Commuter travel requirement leads to such congestion for many urban areas that local governments have now commenced using penalties to discourage commuters from using private cars. For example, the access charge in London, road tolls, petrol taxes etc. At the same time public bodies are using subsidies to encourage bus companies and the like to run uneconomic services.

Typically transport systems use public transport to move commuters from a series of pickup locations to one of a series of destination locations. If commuters wish to go to a location which is not on the route taken by their chosen vehicle they must change en route to another vehicle having a different series of destinations. Such a system produces delays both in waiting for a transport vehicle, in waiting in a transport vehicle while the vehicle takes on more commuters or lets some off at intermediate stops, and in transferring between routes. Additionally in many cases there is no public transport route to a place sufficiently close to a commuter's destination.

It is known to use car pooling in which persons who have made personal contact with others take them as passengers in their own car, usually for a negotiated fee, to the same destination as the driver. This system relies on the personal contact, or on complex interactive scheduling systems which take commuters time to utilise, and so is not effective in mass commuter situations. It has additional drawbacks in that the time of travel to and from work must be the same for all the commuters in a single car, a situation which becomes more and more difficult to meet as the number of commuters in a car increases.

It is also known to have "Park & Ride" schemes, where passengers park their cars and travel in large vehicles (e.g. busses & trains & trams). These systems have long delays awaiting vehicles, and high costs of commercially operated large vehicles including fixed costs and drivers.

We recognise that excessive vehicles for given roads create congestion. The first solution is to build bigger roads, with their long lead times and high capital costs, and the second is to develop and encourage use of public transport, car pooling and park and ride to increase traveller density on arterial roads for a given vehicle density. The problems with public transport are the result of tradeoffs of vehicle size and route frequency versus the cost of a driver and running a route with an underfilled bus or tram. In addition such a system suffers generic delays while the vehicle takes on or lets off passengers at en route stops. This can be obviated by using through flow methods in the vehicle, and by having large doors in comparison to the seating area, but there still remains the problem of transiting between multiple stops with acceleration and deceleration times for each.

One initial problem with normal car pooling systems is in the need for personal contact between the driver and passengers to both establish the initial contact and to verify that the prospective passengers are persons of good repute whom the driver has no major objections to transporting.

A second problem is the inflexibility of travel timing for members of the car pool who must all arrive at and leave work together.

A third problem is the natural resistance of participants to sharing their "private space" in a car, and the need for "cultural change" marketing to change this perspective.

Internet moderated car pools require communication and negotiation time setting up a ride for each day, and require the participants to make judgements about other riders or drivers "sight unseen".

Park and ride has similar problems to public transport. Park and ride and public transport have the problem of distributed passenger trip destinations, whereby the transport vehicle does not usually take all passengers to their exact destination. On arrival at the 'bus stop' passengers must walk or take other modes to get to their final destination. Often the distance to the destination makes this total mode unattractive.

"Slugs and Bodysnatchers" programmes (where drivers pick up hitchhikers to get use of HOV lanes [e.g. bus lanes]) have developed spontaneously in some cities, but work only in the presence of parallel bus routes to provide for riders who cannot get a lift, and generally are higher risk, and more uncertain.

SUMMARY OF THE INVENTION

It is one object of the invention to provide a system for transporting commuters to a chosen destination by providing commuters with identification verification means, providing a location in which a commuter may choose to pick up verified passengers with the same destination or become a passenger in a vehicle with a specified destination and will enable commuters to travel with similar overall journey times and at a lower cost than by using their own cars or one which will at least provide the public with a useful choice.

It is an alternative or additional object of the invention to provide a system by which commuters may be picked up and transported to a dissemination centre from which the commuters may be picked up for transport back to the original location.

It is an alternative or additional object of the invention to enable the sharing of the benefits of participating in the system by keeping track of participation and providing a mechanism for balancing benefits between participants.

It is an alternative or additional object of the invention to enable public bodies responsible for the building of arterial roads to increase the passenger density on roads at peak times for a lower capital cost than construction of additional lanes.

It is an alternative or additional object of the invention to provide a process by which public bodies responsible for urban transport can use incentives, and not penalties, to encourage commuters to utilise road vehicles more intensively.

It is an alternative or additional object to provide (through a benefit sharing system) a practical way in which the kind of subsidies provided to bus and ferry companies can be extended to commuters who fill up their cars thereby helping use road infrastructure more According to a first aspect of the invention there is provided a transport network including:

a vehicle park as a first hub at which authorised commuters may park vehicles or take on board authorised commuters who may have parked vehicles at the park, said vehicle park having at least one pickup zone or lane, each said pickup zone having a specified destination, a computer implementing a record keeping system, said record keeping system: having a record for each of a plurality of authorised commuters, identifying and recording which of the authorised commuters (the driver) is picking up or setting down participating authorised commuters (passengers) and which participating authorised commuters (passengers) have been or are being picked up or set down, debiting each passengers authorised commuter record in relation to the pick up or set down, and crediting the vehicle drivers authorised commuter record, said credit related to said passengers debit.

Preferably the transport network including a second hub at which authorised commuters may be taken on board vehicles to travel to the first hub.

Preferably the transport network including at least one pick up point from which authorised commuters may be transported to the second hub.

Preferably the transport network including at least one pick up point from which authorised commuters may be transported to the vehicle park.

Preferably the transport network further includes identifiers, which identify a commuter as an authorised commuter.

Preferably the record keeping system relies at least in part on the existence and/or use of one or more of the identifier(s).

Preferably the identifier is remotely detectable and/or remotely interogable by the record keeping system (whether directly or indirectly).

Preferably the identifier of a passenger in the transport network can also be used as an identifier of a driver and/or vehicle, and wherein the identifier of a driver and/or vehicle can also be used as an identifier of a passenger and the record keeping system can differentiate between the identifier of a passenger in a vehicle and the identifier of a driver and/or vehicle depending on circumstance thereby to benefit drivers at the expense of their passengers.

Preferably the first hub further includes one or more "drive through" lanes from which a commuter may pick up other commuters, the one or more drive through lanes being proximal or adjacent to the vehicle park.

Preferably a transport network as claimed in any one or more of the preceding claims wherein the specified destination is near or at the first hub.

Preferably the destination of the first hub is at the second hub.

Preferably the first hub is in a suburban location and the second hub is in or proximal to a city.

Preferably there is arterial route between the first and second hubs.

According to a second aspect of the invention there is provided a method of operating a transport network, the method comprising the steps of:

identifying a vehicle park as a first hub at which authorised commuters may park vehicles or take on board authorised commuters (passengers) who may have parked vehicles at the park, the vehicle park having a specified destination for at least one pick up zone or lane, creating a record for a plurality of authorised commuters, recording which of the authorised commuters (the driver) is picking up or setting down participating authorised commuters (passenger(s)) and which participating authorised commuters (passengers(s)) have been or are being picked up or set down, debiting each passenger's authorised commuter record in relation to the pick up or set down, and crediting the vehicle drivers authorised commuter record, said credit related to said passenger's debit.

Preferably the method of operating a transport network, further including the step of identifying a second hub at which authorised commuters may be taken on board vehicles to travel to the first hub.

Preferably the method of operating transport network, further including the step of identifying at least one pick up point from which authorised commuters may be transported to the second hub.

Preferably the method of operating a transport network, further including the step of identifying at least one pick up point from which authorised commuters may be transported to the vehicle park.

In another aspect the invention consists in a transport system having commuters with identification ("identifiers") authorising them to take part in the transport system, at least one vehicle park in which authorised commuters may park vehicles and/or take on board authorised commuters who may or may not have parked vehicles at the or a vehicle park and transport them to a specified destination and/or for set down near the specified destination, and at or near the specified destination, a pickup point or pickup points from which authorised commuters may be transported to the or a specified vehicle park and/or may be transported via a hub (optionally for or with vehicle transfer) to the or a specified vehicle park.

Optionally the authorisation is accompanied by a token for the commuter which token may be remotely detectable. Preferably the token is a ticket redeemable for a fee.

Optionally the authorisation is accompanied by a token for the commuter's vehicle which token may be remotely interrogable.

Preferably both vehicles and/or commuters are recognised on entry to and/or on leaving the vehicle park by their respective tokens and/or identifiers.

In another aspect the invention consists in a transport system having commuters with identification and/or vehicles with identification ("identifiers") authorising them to take part in the transport system, at least one vehicle park in which authorised commuters may park vehicles or take on board authorised commuters who may have parked vehicles at the or a vehicle park and transport them to a specified destination, and/or for set down near the specified destination, at or near the specified destination, a pick up point or pickup points from which authorised commuters may be transported to the or a specified vehicle park, and/or may be transported via a hub (optionally for vehicle transfer) to the or a specified vehicle park, and a benefit sharing system involving the use of the identifiers at the vehicle park(s) and/or hub whereby an authorised commuter, when a driver of authorised commuter(s), benefits at some detriment to each carried commuter.

Preferably the at least one vehicle park is a car park.

Preferably the vehicle park(s) in which the authorised commuters park vehicles are oriented to facilitate the parking and pickup of vehicles for a destination.

Preferably the vehicle parks are divided into "drive through" lanes, from which a commuter may pick up other commuters, and parking areas.

Preferably the parking areas are centred around the "drive through" lanes.

Preferably the parking areas provide angle parking along the "drive through" lanes.

Preferably each specified destination has at least one "drive through" lane.

Optionally on initial entry to a vehicle park, an entry board to a vehicle park displays one or more of the "drive through" lanes in use for a specified destination, and the average time before departing the vehicle park.

Optionally, there is also viewable by commuters, the average commuters exiting per vehicle for said destination, and the time separation between vehicles for that destination.

Preferably said at least one vehicle park is a hub (e.g. a "suburban hub") for inward or originating commuters.

The urban hub is designed to facilitate the transfer of riders to vehicles destined for their suburban car park.

Optionally, the outward or return hub has at least some of the features of said vehicle park(s).

In another aspect the invention is a vehicle park of or suitable for a transport system of the present invention, the vehicle park having at least one non-parking lane located between parking lanes and spaced to allow loading of authorised commuters exiting vehicles in the parking lanes into vehicles in the non-parking lanes.

In yet another aspect the invention is a method of loading persons into vehicles comprising or including defining a parking area in which vehicles may be parked and adjacent a pickup path for a transporting vehicle, and having commuters park in said parking area and be picked up by a vehicle in said pickup path.

In another aspect the invention is a method to enable commuters to easily decide whether to ride or drive, comprising or including suitably arranging parking areas adjacent to drive through lanes with the intention the riders and/or waiting cars are visible to incoming commuters about to decide whether to ride or drive.

In another aspect the invention is a method of loading persons into vehicles comprising or including defining a parking area in which vehicles may be parked adjacent a preceding vehicle and adjacent a pickup path for a transporting vehicle, parking successive adjacent vehicles, disembarking from said adjacent vehicles and entering a vehicle in said pickup path at or near said adjacent vehicles.

The invention also is a benefit sharing system in or for a pick up or set down transportation system, the benefit sharing system comprising or including an identifier for each passenger to be and/or being carried by a vehicle, an identifier for each driver and/or vehicle to carry or carrying at least one passenger (passenger(s)), at least one reading apparatus of the identifiers, and a record keeping system able to attribute (A) a debit against each identifier of a passenger whose identifier(s) have been read by the at least one reading apparatus and (B) a credit against each identifier of each driver and/or vehicle whose identifier(s) have been read by the at least one reading apparatus and wherein the identifier of a passenger can also be used as an identifier of a driver and/or vehicle, the identifier of a driver and/or vehicle can also be used as a identifier as a passenger and the at least one reading apparatus and/or record keeping system can differentiate between an identifier of a passenger in a vehicle and the identifier of a driver and/or the vehicle depending on circumstance thereby to benefit drivers at the expense of their passengers.

Preferably each passenger and/or driver and/or vehicle is a member of a commuter transport system of the present invention using the benefit sharing system.

Preferably the transport system is as aforesaid.

In another aspect the invention is, forming part of a transportation network, an arrangement comprising or including an onramp to a motorway, arterial road or the equivalent, and a participating commuter pickup station in proximity to said onramp and having an exit to, or an exit leading to the onramp, said station being in the form of a vehicle park having zones or lanes for vehicles not to be parked up and to uplift passengers inter alia from participating commuters parking up in the vehicle park, and wherein there is or is to be a benefit sharing system in existence between those participants that drive a vehicle that uplifts participating commuter(s) at some detriment to each uplifted commuter.

Preferably said onramp is a controlled onramp (e.g by lights as a means of monitoring addition into the motorway).

In another aspect the invention is an apparatus in or for a pick up and set down system for participating users, said apparatus having, in conjunction with a pick up or set down zone or lane, or exit therefrom, of a vehicle park, reading or the like apparatus to identify which of the participating users is picking up or setting down participating users and which participating users have been and/or are being picked up or set down, and a record keeping system to benefit the vehicle driving participant(s) at some detriment to the passenger participants.

The invention is also a transport network having a vehicle park as a first hub at which authorised commuters may park vehicles or take on board authorised commuters who may have parked vehicles at the park, a second hub at which authorised commuters may be taken on board vehicles to travel to the first hub, at or near a specified destination, at least one pick up point from which authorised commuters may be transported to the vehicle park or to the second hub and optionally with vehicle transfer to the vehicle park, a recording system, wherein the vehicle park has a specified destination for at least one pick up zone or lane, and wherein authorised commuters and authorised commuters as participating drivers are recorded at one or both the first hub vehicle park and/or the second hub to identify which of the authorised commuters is picking up or setting down participating authorised commuters and which participating authorised commuters have been or are being picked up or set down, and wherein the record keeping system benefits the vehicle driving participant(s) at some detriment to the driving participants' passenger participant(s).

The invention is also a transport system having commuters with identification ("identifiers") authorising them to take part in the transport system, at least one vehicle park in which authorised commuters may park vehicles and/or take on board authorised commuters who may or may not have parked vehicles and transport them to a specified destination and/or for set down near the specified destination, and a hub at which vehicles (of authorised commuters) may take on board authorised commuters and transport them to the or a said vehicle park, and optionally near the specified destination, pickup points from which authorised commuters may be transported to the hub and from thence to a said vehicle park.

In still another aspect the invention is a transport system having commuters with identification and/or vehicles with identification ("identifiers") authorising them to take part in the transport system, at least one vehicle park in which authorised commuters may park vehicles and/or take on board authorised commuters who may or may not have parked vehicles and transport them to a specified destination and/or for set down near the specified destination, a hub at which vehicles of authorised commuters or others may take on board authorised commuters and transport them to the or a said vehicle park, optionally near the specified destination, at least one pickup point from which authorised commuters may be transported back to the hub, and a benefit sharing system involving the use of the identifiers at the vehicle park(s) and/or said hub whereby an authorised commuter, when a driver of authorised commuter(s) leaving and/or returning to or arriving at the vehicle park(s) and/or hub, benefits at some detriment to each carried commuter.

Optionally said hub is a vehicle park.

More likely said hub is not a vehicle park.

The invention is also, forming part of a transportation network, an arrangement comprising or including an onramp to a motorway, arterial road, or the equivalent, and a hub in proximity to said onramp and having an exit to, or leading to the onramp, said hub being in the form of a vehicle park and/or passenger acquisition station having zones or lanes for vehicles to uplift participant passengers, and wherein there is or is to be a benefit sharing system in existence between those participants that drive a vehicle that uplifts participating commuter(s) at some detriment to each uplifted participant passenger.

Optionally said hub is a vehicle park.

More likely said hub is not a vehicle park.

In another aspect the invention is a transport network having at least one motorway, arterial road or the like to be taken by commuters, at least one vehicle park at which authorised commuters may park vehicles and/or take on board authorised commuters who may or may not have parked vehicles at the park for a specified destination and/or for set down near the specified destination, a hub at which at least authorised commuters can pick up into vehicles authorised commuters to travel to a or the vehicle park, optionally, near the specified destination, at least one pick up point from which authorised commuters may be transported to the hub, and a recording and record keeping system, wherein the vehicle park(s) has a specified destination for at least one pick up zone or lane, and wherein authorised commuters and authorised commuters as participating drivers are recorded at the or a vehicle park and/or the hub to identify which of the authorised commuters is picking up or setting down participating authorised commuters and which participating authorised commuters have been or are being picked up or set down, and wherein the record keeping system benefits the vehicle driving participant(s) at some detriment to the driving participants' passenger participant(s).

The invention is also a transport network having at least one motorway, arterial road, or the like to be taken by commuters, a vehicle park at which authorised commuters may park vehicles and/or take on board authorised commuters who may or may not have parked vehicles at the park for a vehicle park specified destination and/or for set down near the specified destination, a hub closer to the specified destination than the vehicle park at which at least authorised commuters can pick up into vehicles authorised commuters to travel to the vehicle park, and a recording and record keeping system, wherein the vehicle park has a specified destination for at least one pick up zone or lane, and wherein authorised commuters and authorised commuters as participating drivers are recorded at the vehicle park and/or the hub to identify which of the authorised commuters is picking up and/or setting down participating authorised commuters and which participating authorised commuters have been and/or are being picked up or set down, and wherein the record keeping system benefits each vehicle driving participant(s) at some detriment to the driving participant's passenger participant(s).

Preferably there is, near the specified destination, at least one pick up point from which authorised commuters may be transported to said hub.

Optionally there is provided a method of rapidly providing means for urgent return from the place of work to the carpark during the working day in case of emergency for a rider whose car is in the carpark.

In another aspect the invention consists in a transport system comprising providing commuters with identification authorising them to take part in the transport system, providing vehicle parks in which authorised commuters may park vehicles or take on board authorised commuters who have parked vehicles and transport them to a specified destination, and providing, at or near the specified destination, pickup points from which authorised commuters may be transported back to a specified vehicle park.

In still another aspect the invention is a method of recording the rides given and taken by each participant, and the balance of benefits or obligations they have. The present invention preferably also provides a program of marketing cultural change perspectives, to enable a significant proportion of travellers to accept the idea of sharing their vehicle with strangers, or riding in a stranger's vehicle.

The present invention preferably also provides a program of marketing joint public-private co-operation between private sector operators and marketers, and public sector providers of road transport infrastructure, to enable the effective location and construction of facilities.

It is envisaged that (optionally) some drivers may pick up passengers from a small suburban region (from their home, or local streets) and bring them to the suburban hub, and collect additional passengers there. The drivers would be credited with bringing these passengers to the system. These passengers would either travel back at the end of the day with their driver, or make alternative arrangements to get from the suburban hub home in the evening.

Inducements may include the ability of drivers and their passengers to be favoured, as authorised participants of the scheme, to access [if allowed irrespective of fill or if appropriately filled] HOV lanes (e.g bus lanes in New Zealand).

As used herein "pax" means "passenger".

As used herein "comprising" or variations thereof means both or either consisting only of or including.

As used herein the term "and/or" means "and" or "or", or both.

As used herein the term "(s)" following a noun includes, as might be appropriate, the singular or plural forms of that noun.

As used herein the term "authorised" or "participant" or "participating" in respect of a commuter preferably includes such a commuter whether as a driver or as a passenger having the requisite identifier capable of being read.

As used herein "near" can include "at" the case of a specified destination.

As used herein the term "read" or variations of it includes any means by which an identifier can have information collected from it (e.g. scanning, RF transmission, etc.).

As used herein the term "commuter" includes to any passenger and/or driver likely to be involved in a high frequency journey. The term however encompasses also participating less frequent passengers and/or drivers.

As used herein the term "hub" is indicative of the prospect of a site having lanes or zones at which pick up vehicles and/or set down vehicles can pass to pick up authorised commuters and/or to set down authorised commuters. In some forms, if an urban hub, it may not be a vehicle park of the type referred to but optionally it can. An urban, as opposed to suburban, hub is more likely to not be a vehicle park and is exclusively for pick up of passengers some of whom may have been set down at the hub by vehicles from pick up points near a specific destination.

There is also the prospect of providing participants at a vehicle or hub park with a range of services whilst their cars are parked there, (car servicing, dry cleaning, grocery shopping, etc. (e.g. leave order in the morning, and it is in your car by 5 pm)).

As used herein the term "vehicle park" preferably relates to a more suburban hub than say an urban hub at which parking provision would be at a premium.

As used herein "pick up point" includes any pre-arranged or designated place whether street side or otherwise.

The term "comprising" as used herein means "consisting at least in part of", that is to say when interpreting independent paragraphs including that term, the features prefaced by that term in each paragraph will need to be present but other features can also be present.

BRIEF DESCRIPTION OF THE DRAWINGS

These and other aspects of this invention, which would be considered as novel in all aspects would become apparent from the following description, which is given by way of example only, with reference to the accompanying drawings in which.

DETAILED DESCRIPTION OF THE DISCLOSED EMBODIMENTS

Figure 1:
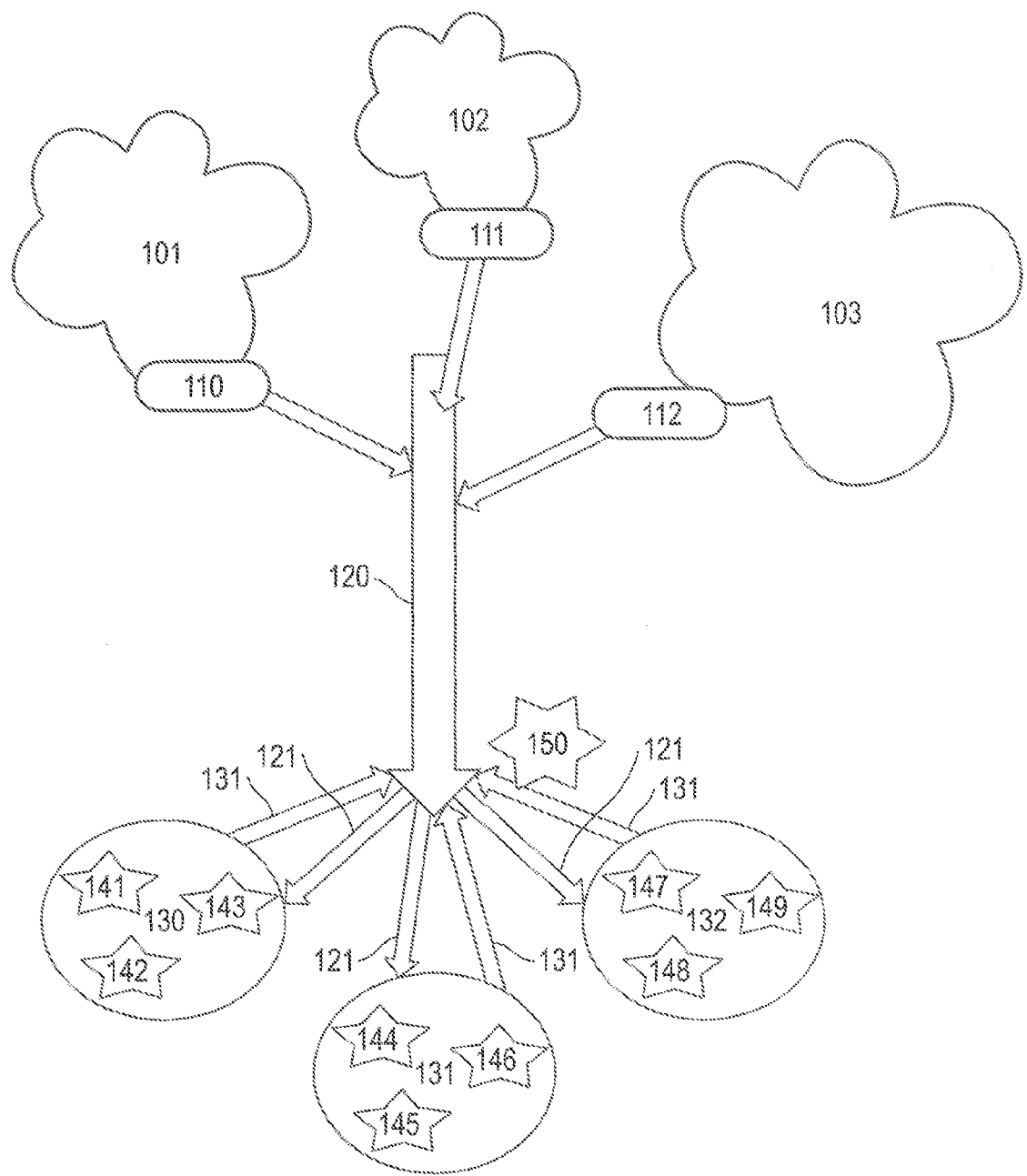
FIG. 1 shows a block diagram showing the path of a commuter to and from work or other event in an urban area, FIG. 2 (A and B variants) show diagrams of a car park laid out to enhance the performance of such a system.
Figure 2A:
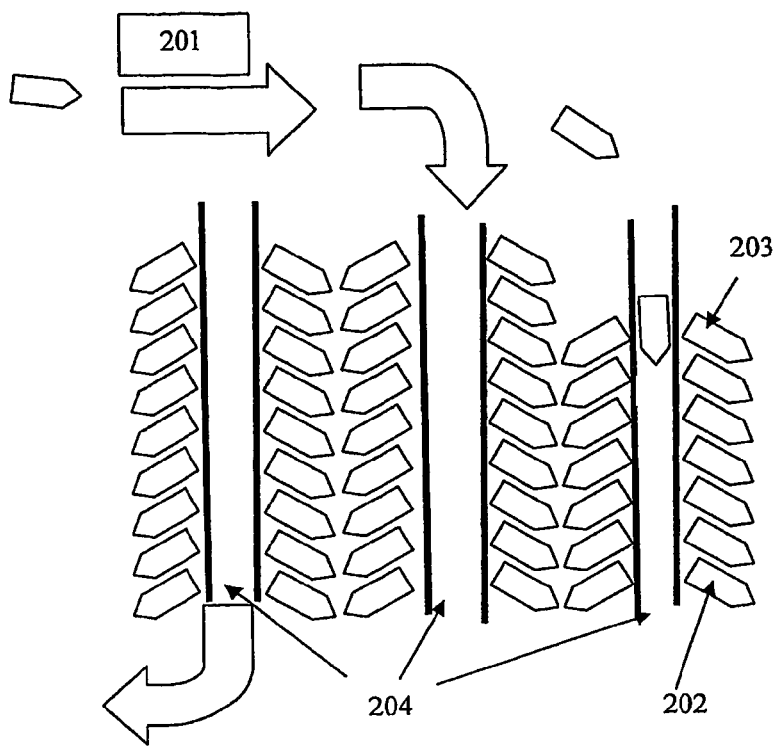

In FIG. 1 a commuter from one of areas 101, 102, 103 takes a vehicle to a vehicle park 110, 111, 112 as better shown in FIG. 2, and, decides to park his vehicle there. He makes a judgement about whether to drive or ride, and parks in a park beside a "drive through" lane to his chosen urban area and walks a few meters to the "drive through" lane where a driver who has opted to drive in to the urban area is either waiting for passengers or will shortly arrive.

The commuter is then transported by the driver who has opted to drive onto an arterial road, motorway or other route, 120 and via a route 121 to his desired urban area 130 and preferably dropped close to his ultimate destination.

An inducement will be the ability of drivers and their passengers to be favoured, as authorised participants of the scheme, to access [if allowed irrespective of fill or if appropriately filled] HOV lanes (e.g bus lanes in New Zealand).

Figure 3:
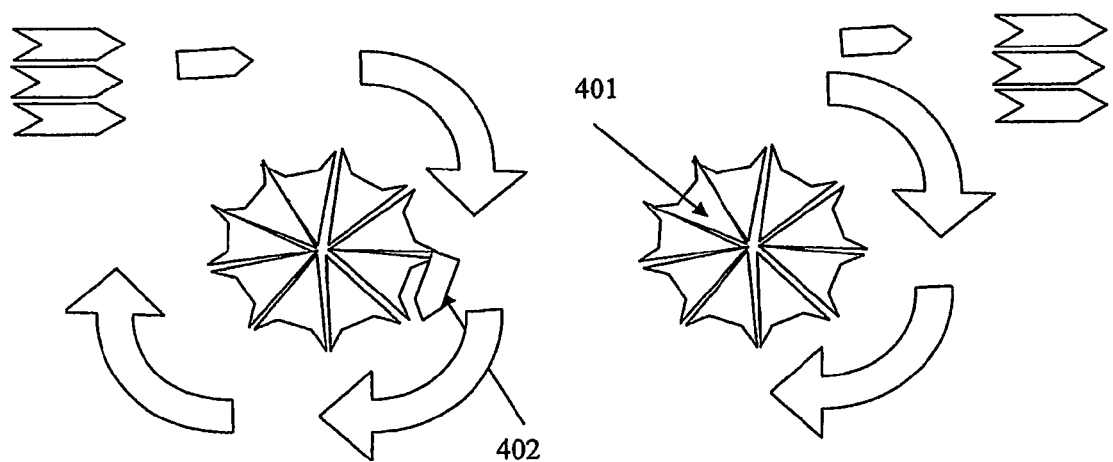
FIG. 3 shows a simple urban hub.
Figure 4A:
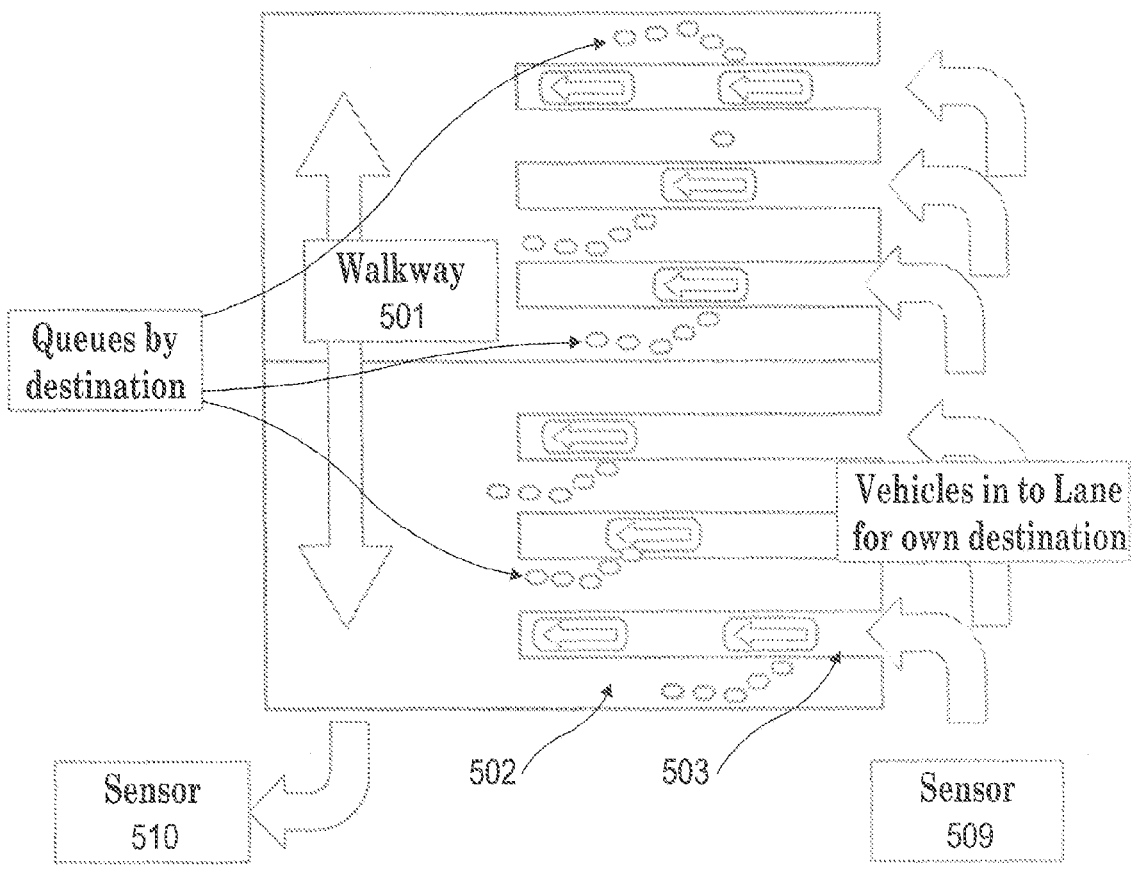
FIG. 4A shows an alternative and preferred urban hub.
Figure 4B:
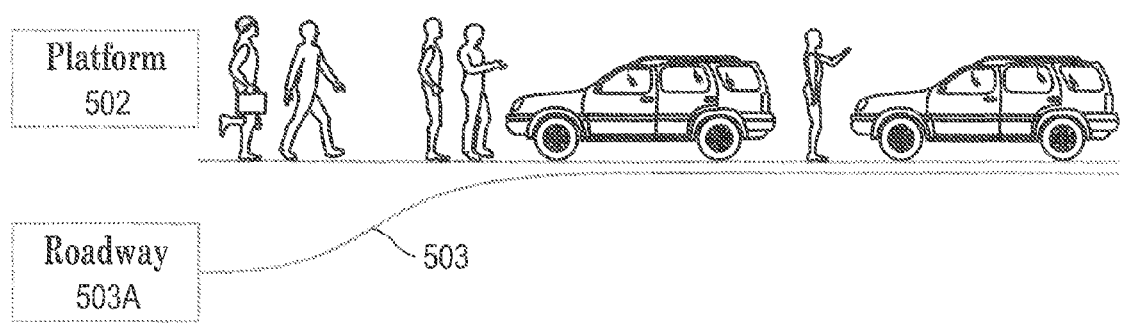
FIG. 4B shows another aspect of the FIG. 4A hub.

After working the day, or at the end of the event, the commuter exits to a local pick up point, 141,142 . . . 149 in area 130,131,132 . . . where a commuting driver on her way home opts to transport other commuters firstly to a local urban hub 150, in or adjacent to area 130, 131, 132 where they may move to a pickup point for the vehicle park 110, 111, 112 in which their vehicle is parked, while the commuting driver drives to the pickup point for her chosen vehicle park, to pick up other commuters for that destination. A rapid flow layout, see FIGS. 3 and 4 is required.

Because of the need to get home in emergency, and the possibility that drivers in the system may drive directly home, rather than diverting via the urban dissemination centre and the original vehicle park it is necessary to provide a backup system for aiding commuters to return to their vehicle park. This preferably takes the form of contracted vehicles and drivers. This action may be initiated by the urban centre manager. Typically such vehicles may be either buses or taxis. It could also be an operator's lent vehicle.

FIG. 2 shows a typical car park laid out with "drive through" lanes. The diagram shows the entry to a car park, with a sensor 201 which detects the remotely detectable tokens of the participants and their vehicles as they enter. The participants can make ride/drive choices based on physically seeing whether the queue is for drivers or riders in their destination lane.

The driver then diverts to the area for their chosen destination, and either parks in an angled park 202, preferably taking the last free park 203 in the line, or drives into the "drive through" lane 204 where the driver stops even with the last free park in the line. Drivers who are parking their cars for the day are just exiting from their vehicles at this point and will simply walk out of their car and into the "drive through" car.

The "drive through" lanes may be allocated on a day to day basis, but are preferably reasonably constant over time to avoid confusing users. The length of a "drive through" lane is a function of the number of cars for that destination point, the number of other "drive through" lanes for that destination point, and the maximum desired waiting time. If the balance of parking cars to "drive through" cars is right a minimal stopping time is required, assuming a popular destination, and the "drive through" car exits to its declared drop off area.

Clearly if the destination point is not popular the "drive through" driver will not wish to wait some time to get a full load and may exit the lane with only one or no passengers, while if the destination point is popular the waiting time will be low regardless of whether a driver decides to ride or drive.

As an alternative to separate parking and drive through lanes the parking lane and the drive through lane may be one and the same. In this case the driver entering the lane may decide to drive if more than two persons are waiting for a ride, or may decide to park if one or no persons are waiting and the waiting time is clearly low.

In some instances, the suburban car parks will be associated with Motorways using On-Ramp metering to facilitate flow control of motorway traffic. In this case there is the alternative of providing preferential entry to the Motorway, through integration of the On-ramp control system with the Suburban carpark on ramp controls. This enables preferential access to vehicles with 3 or 4 passengers. In this instance, the access routes to the suburban car parks will be designed to be via routes that are not congested by the backlog of normal on-ramp metered routes.

At the urban destination of the "drive through" vehicles the vehicle passengers may either be left to walk from a central location, or may be preferably delivered close to their actual destination.

At the end of the work day or other event the drivers with vehicles in the urban area, and the former passengers will move to "pick up" points (FIG. 1 items 141 . . . 149). Drivers will collect passengers and take them to urban centres such as shown in FIGS. 3 and 4

Preferably the urban hubs (e.g. as urban centres) are a series of platforms in parallel (FIG. 4A) where drivers may drop off passengers, and collect passengers going to their own suburban carpark. Passengers walk along the walkway 501 between platforms, to join a ride queue for their suburban park. Vehicles arrive and they and their commuters are detected by sensor 509. They collect into vehicles on lanes 503 passengers at each platform (502) and depart on the roadway (503A) and both are detected on exit by sensor 510 (See FIG. 4B).

Alternatively, urban centres are circular pedestrian shelters 401 labelled with their destination vehicle park and allowing vehicles 402 to park temporarily alongside so that commuters may alight from the vehicles that have brought them in, and walk to the loading bay for their destination car park, where they board vehicles going to a specified vehicle park.

The urban hub might be located in 1 or 2 floors of an Urban Parking Building. Location requirements are that the entry be off an accessible urban road, not constricted by normal motorway on ramp traffic. Exit is via a dedicated Motorway On ramp, preferably with some access priority if on ramp metering is in use.

To share the benefits of the system between drivers and riders, tokens may be provided and exchanged or recorded. A person riding in a vehicle will provide a token to the driver, who may collect them and either use them himself when he rides with someone else or redeem them through a token issuing authority. The tokens may merely be tickets or they may be electronic records, or actuated by smart cards with storable data.

At a more complex level both persons and vehicles may be provided with remotely detectable tokens, which may include smart cards. Remote sensing or interrogation of these allows tracking of which vehicle entered the park, which persons it was carrying, which vehicles went to which destination point, which became a "drive through" vehicle (and hence which did not) and who exited in which "drive through" vehicle.

Similarly on return to a car park it is possible to sense which persons are in an entering vehicle, and from this determine where their vehicles are parked, and what are the best stop off points for unloading them. The use of the scanning to show drop off points is probably an unnecessary complication.

Such a remote detection system removes the need for participants to carry a number of tokens with them to use in each ride.

Figure 5:
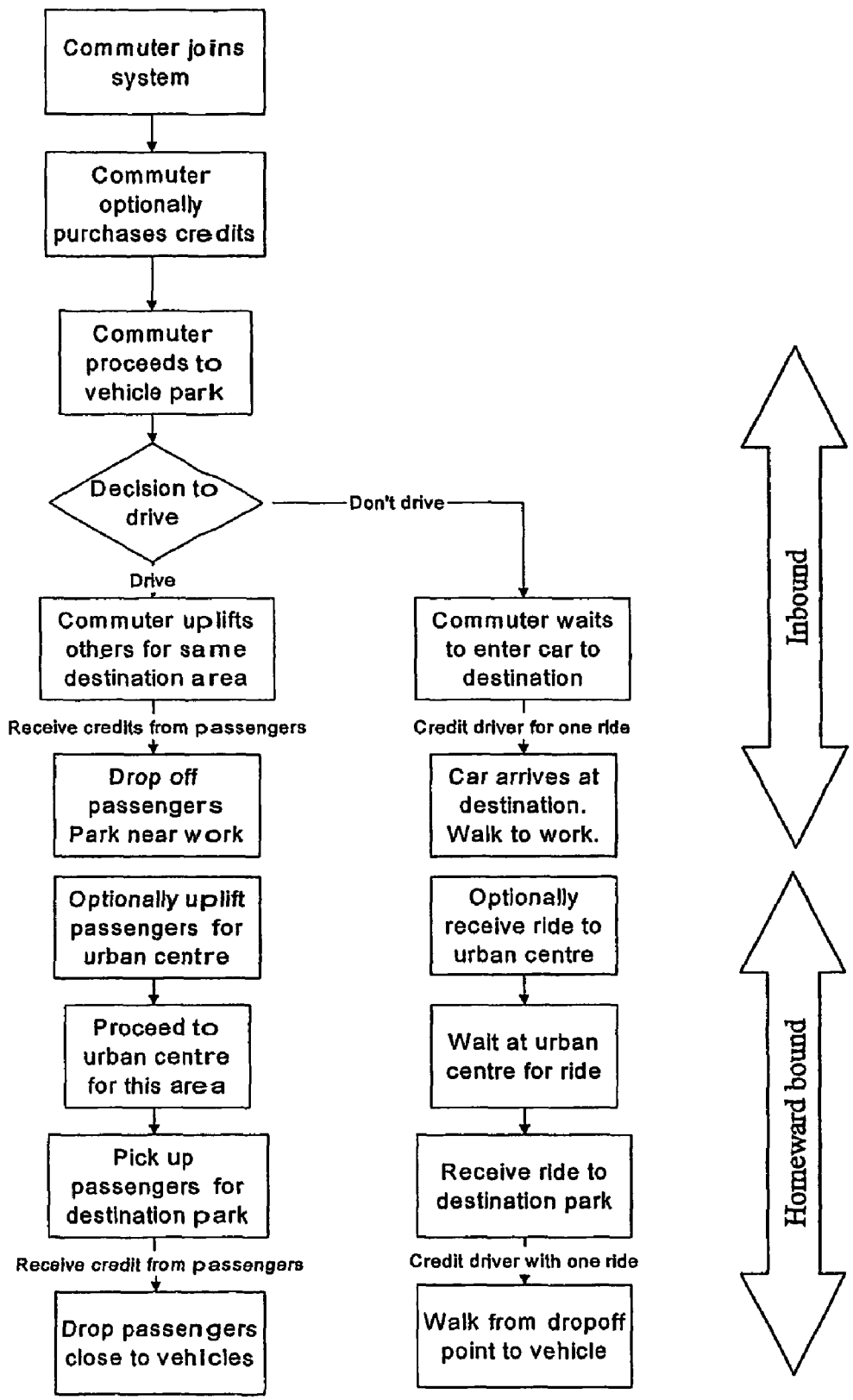
FIG. 5 shows a flow diagram of the method of tracking commuters and providing them with credits and debits.

FIG. 5 shows a block diagram of the method of tracking persons and vehicles, and the method of either charging or crediting them. Typically a remote token sensor senses both vehicle tokens, which are fastened to the vehicle, and personal tokens, which are carried by the users of the system. Information about the owner of a vehicle is noted against the vehicle record and information on the carriers of tokens is also held, allowing debiting and crediting of accounts. The number of times a persons vehicle is used to transport others can be counted, as can the number of persons carried.

A vehicle entering or leaving a car park may be recorded and the location of the parking destination area which it enters also may be recorded. If the vehicle takes on passengers these are counted as it leaves the car park and the vehicle is credited with an amount for each person on board. The amount of the debit may vary with the distance to the specified destination area.

On entering the system again after a working day that vehicle would again be credited for the persons on board (including the driver), and the passengers would be debited. Delivering passengers to the urban centre, and the return trip from urban centre to carpark may both be recorded, and appropriate token credits issued.

Other vehicles which had parked for the day could, on leaving the car park, be debited for a days parking, since the time span between entry and exit would exceed that set for a normal pickup or drop off manoeuvre.

Because the system can check vehicles both into the car park and out of the car park it is possible to determine the "residence" time of a vehicle going to a specified destination, and the number of persons aboard, and hence the likely waiting time for a ride to that destination. Similarly it is possible to determine when a parking area is becoming full, by merely counting cars into and out of that space, and to open a new area to parking for the same destination.

Verification to the vehicle driver's satisfaction that all passengers would contribute to the vehicles credit would be in the form of a sign at the car park exit associated with the "drive through" lane and the normal entrances showing the number of persons detected as being within the vehicle. Alternatively an exiting driver might receive a ticket type report from a roadside exit control at the exit point.

On arrival at that park the personal tokens may be detected, associated with the approximate location of the vehicle within the park in which they arrived, and a "drop off" route suggested to the driver to best meet the needs of the passengers.

The urban "pick up" centres may incorporate sensors for the personal tokens of persons waiting for or within a vehicle, and interpretation of these sensors may provide a method of rapidly directing contracted vehicles to a point requiring more vehicles.

Various charges may be set up to allow the system to cover whatever operating costs are involved, typically in maintaining vehicle parks and tracking users of the system. Items which may be charged for are such things as joining the system, using the system daily (whether as a driver or a passenger), being picked up from an urban area and parking in the vehicle park. Concomitantly fees may be received from transferring passengers from one place to another.

Typically where physical tokens (tickets) are provided to a driver by a passenger the amount redeemable by the driver is usually less than that paid by the passenger.

It is possible to allow the system to be used by itinerant users who do not have personal tokens, such users being expected to have access to a one use "ticket" printed from a credit card or funds transfer transaction.

Persons without cars—cyclists or pedestrians—may join the system, and be issued with identification, enabling them to walk or ride to the suburban facility, and get a ride from there to the urban area. Cyclists may secure their bicycles at the vehicle park.

The system described relies on tokens, however it is possible to create a system relying on other means, for instance SMS messaging from mobile phones associated with charging, e.g. of a message "PAQUIS ENG203221" to a specified number, where "ENG203221" is the vehicle registration, could provide returned confirmatory "messages of the day" noting the crediting of a drivers account which a passenger could show to a driver.

An SMS example is that a message specifying the time, date, and driver's registration, could be sent, and a confirmatory message response automatically received, so that a passenger could confirm to the driver that a token credit had been transferred.

While the invention is described as a virtually stand alone system for private motorists it is clear that integration with public transport is a possibility. For instance the vehicles passing down the "drive through" lanes may be only buses provided by a local authority, and similarly the vehicles returning drivers to the vehicle parks may be buses, trams or similar. The urban portion of the system may be entirely supported by public transport linking the "pick up" sites to the obvious source areas of pedestrian traffic on a ring or shuttle basis.

Another element is video recording, and computer recognition of licence plates to capture vehicle movements and as data backup.

Figure 6A:
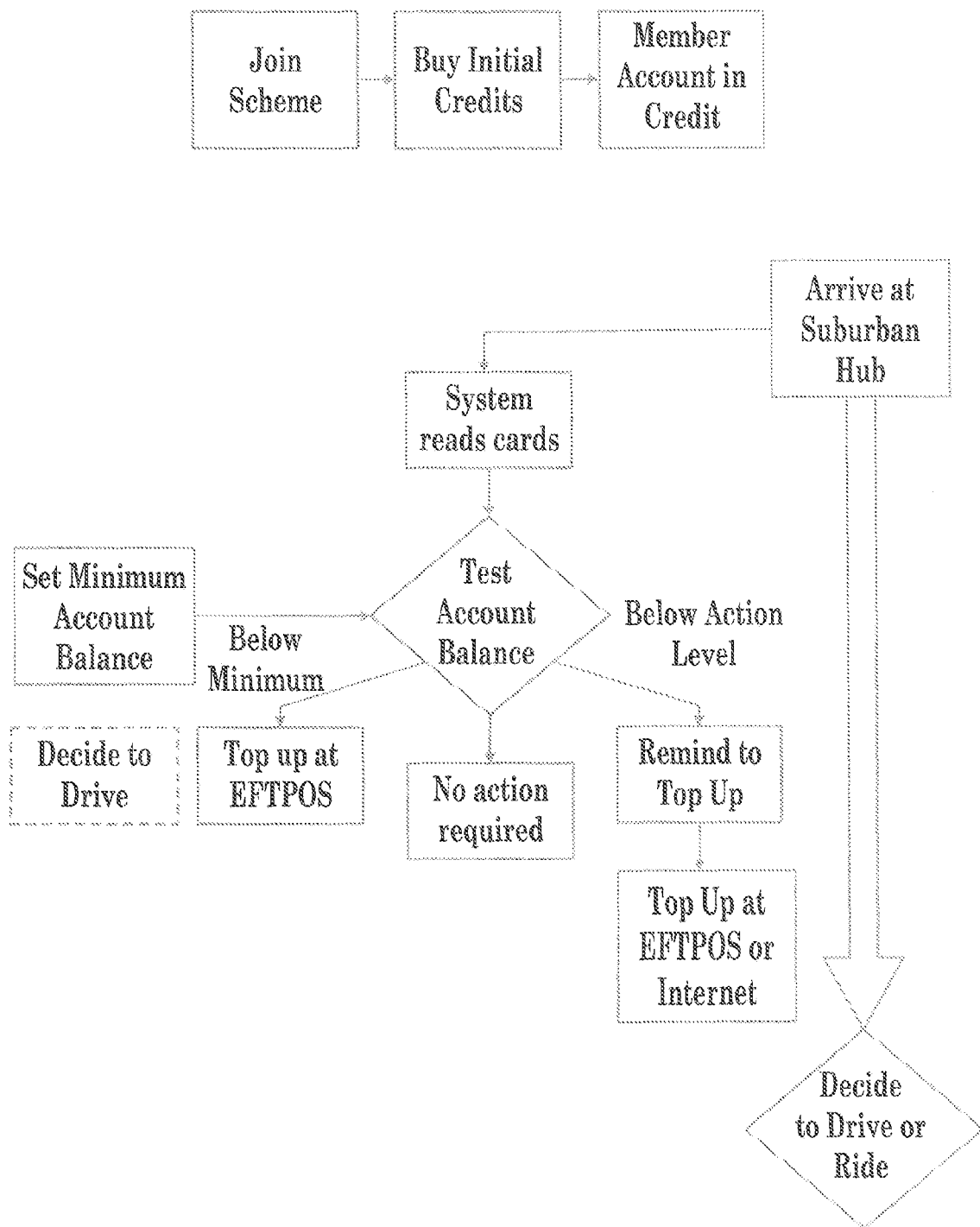
FIGS. 6A, 6B and 7 show flow diagrams of the benefit sharing system for morning and evening travel respectively.
Figure 6A:
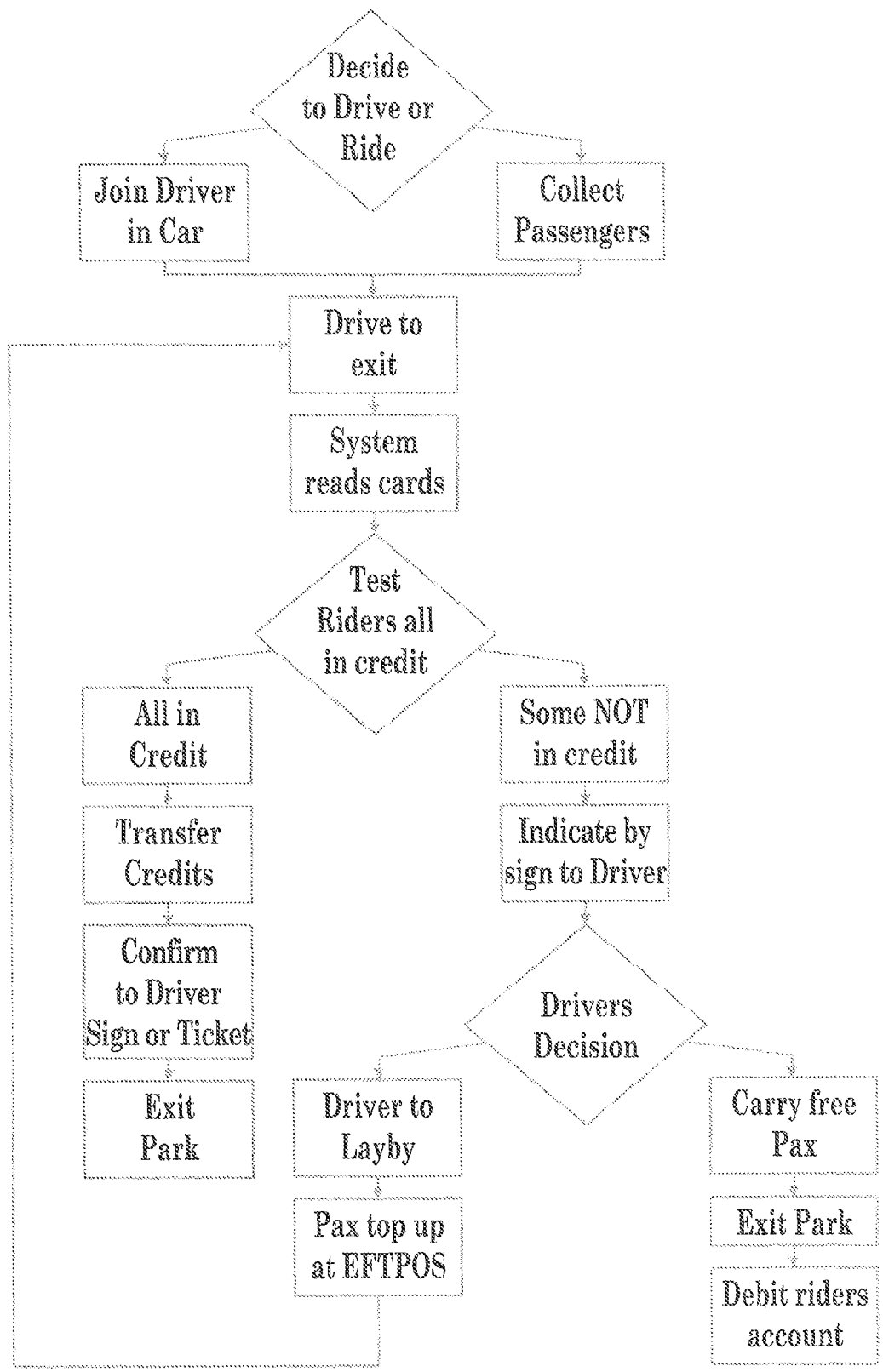
Figure 6B:
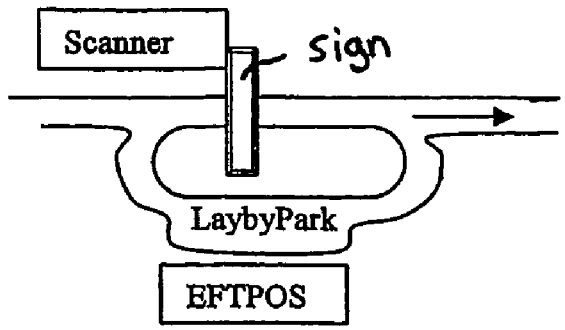

FIG. 6A (to sheets of drawings) shows as a flow diagram a preferred Benefit Sharing System Flow Chart Morning Processes. FIG. 6B relates an EFPOS machine to the scanner and lay by park.

Figure 7:
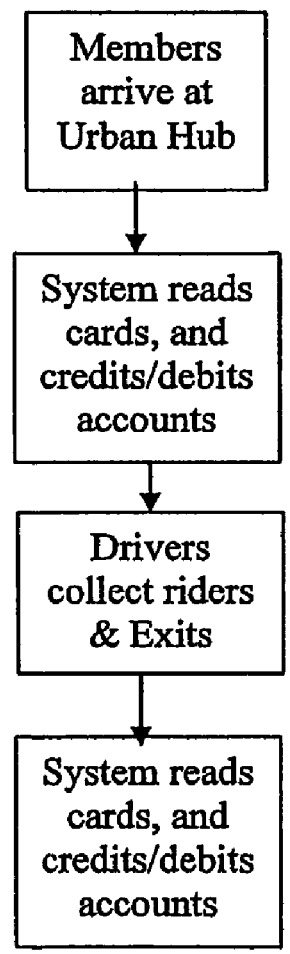

FIG. 7 shows as a flow diagram and Benefit Sharing System Evening Processes.

Process Summaries of One Preferred Embodiment.
Daily Account Review Process
  Member accounts reviewed overnight.
  Accounts at Minimum or Action level identified, and optional advice by Email. Accounts labelled for action at next entry to system.
  Accounts at Top-up level notified, and intention to post credit to Bank Account notified.
Get Home Safe Planning Service System
  Morning traffic is analysed from Origins to Destinations, by Riders and Drivers. Total numbers of Riders & Drivers returning from the Urban Hub to each Suburban Hub is then known.
  During the day, cumulative records of Riders and Drivers leaving the Urban Hub for each Suburban Hub are recorded, and both cumulative numbers and Rider/Driver ratios are monitored. Historical Means and Distributions will provide statistical warning of any likely shortage of Drivers to any Suburban Hub, and of numbers of travellers still to return from time to time throughout the evening rush hour.
  From entry and exit data at the Urban Hub, the "waiting stock" of travellers, (both riders and drivers) is known, and monitoring this level will indicate the development of excess queues to any destination.
  Warning set points on these parameters will allow the Urban Hub staff to take action to arrange alternative transport for riders who need an alternative either through shortage of cars, or too lengthy waiting times.
  Display signs at the Urban hub will advise drivers of destination hubs which require "full loads" to ensure that all riders can be accommodated.
Ride Credit Trading System
  The organisation may buy & sell ride credits.
  One option is that it will set the prices of buying and selling with a margin which covers the system operating costs so that the price of credits to drivers with excess will be less than the cost of buying ride credits to riders. In this case the organisation is the only market maker, and all transactions must be done through the organisation.
  Another option is that membership and usage fees will cover all costs, and the market price of ride credits will be set by supply and demand. In this case the Organisation will be a market maker, with a ride credit trading website, but the buy-sell margin will only be to cover trading costs.
  Credits can either be of common value—all rides have the same value—or can be valued in steps. Steps are typically set as follows
  Credit 1 Pick up pax & return to Urban Hub or Bring Pax into Suburban Hub
  Credit 2 Trip 0-5 km between Suburban & Urban Hub
  Credit 3 Trip 5-10 km between Suburban & Urban Hub
  Credit 4 Trip 10-15 km between Suburban & Urban Hub
  Credit 5 Trip over 15 km between Suburban & Urban Hub

What we claim is:

1. A transport network including:
   a vehicle park as a first hub at which authorized commuters, on a non pre-designated basis, may park vehicles or take on board authorized commuters, said vehicle park having at least one pickup zone or lane, each said pickup zone having a specified destination,
   a computer implementing a record keeping system, said record keeping system:
     having a record for each of a plurality of authorized commuters,
     identifying and recording which of the authorized commuters is the driver and which are the passengers,
     debiting each passengers authorized commuter record in relation to the pick up or set down, and
     crediting the vehicle's driver's authorized commuter record, said credit related to said passenger's debit.

2. A transport network as claimed in claim 1 further including a second hub at which authorized commuters are taken on board vehicles to travel to the first hub.

3. A transport network, as claimed in claim 2 further including at least one pick up point from which authorized commuters are transported to the second hub.

4. A transport network, as claimed in claim 1 further including at least one pick up point from which authorized commuters are transported to the vehicle park.

5. A transport network, as claimed in claim 3 further including at least one pick up point from which authorized commuters are transported to the vehicle park.

6. A transport network as claimed in claim 1 wherein the transport network further includes identifiers, which identify a commuter as an authorized commuter.

7. A transport network as claimed in claim 2 wherein the transport network further includes identifiers, which identify a commuter as an authorized commuter.

8. A transport network as claimed in claim 5 wherein the transport system further includes identifiers, which identify a commuter as an authorized commuter.

9. A transport network as claimed in claim 6 wherein the record keeping system relies at least in part on one or more of the identifier(s).

10. A transport network as claimed in claim 7 wherein the record keeping system relies at least in part on one or more of the identifier(s).

11. A transport network as claimed in claim 8 wherein the record keeping system relies at least in part on one or more of the identifier(s).

12. A transport network as claimed in claim 9 wherein the identifier is remotely detectable and/or remotely interrogable by the record keeping system directly or indirectly.

13. A transport network as claimed in claim 10 wherein the identifier is remotely detectable and/or remotely interrogable by the record keeping system directly or indirectly.

14. A transport network as claimed in claim 11 wherein the identifier is remotely detectable and/or remotely interrogable by the record keeping system directly or indirectly.

15. A transport network as claimed in claim 14 wherein the identifier of a passenger in the transport network is used as an identifier of a driver and/or vehicle, and wherein the identifier of a driver and/or vehicle is used as an identifier of a passenger and the record keeping system differentiates between the identifier of a passenger in a vehicle and the identifier of a driver and/or vehicle depending on circumstance thereby to benefit drivers at the expense of their passengers.

16. A transport network as claimed in claim 1 wherein the first hub further includes one or more "drive through" lanes from which a commuter picks up other commuters, the one or more drive through lanes being proximal or adjacent to the vehicle park.

17. A transport network as claimed in claim 2 wherein the first hub further includes one or more "drive through" lanes from which a commuter picks up other commuters, the one or more drive through lanes being proximal or adjacent to the vehicle park.

18. A transport network as claimed in claim 14 wherein the first hub further includes one or more "drive through" lanes from which a commuter picks up other commuters, the one or more drive through lanes being proximal or adjacent to the vehicle park.

19. A transport network as claimed in claim 2 wherein the specified destination of the first hub is at the second hub.

20. A transport network as claimed in claim 18 wherein the specified destination of the first hub is at the second hub.

21. A transport network as claimed in claim 20 wherein the first hub is in a suburban location and the second hub is in or proximal to a city.

22. A transport network as claimed in claim 21 wherein there is an arterial route between the first and second hubs.

23. A method of operating a transport network on a computer, the method comprising the steps of:
    identifying, by the computer, a vehicle park as a first hub at which authorized commuters, on a non pre-designated basis, may park vehicles or take on board authorized commuters, the vehicle park having a specified destination for at least one pick up zone or lane,
    creating, by the computer, a record for a plurality of authorized commuters,
    recording, by the computer, which of the authorized commuters is the driver and which are the passengers,
    debiting, by the computer, each passenger's authorized commuter record in relation to the pick up or set down, and
    crediting, by the computer, the vehicle driver's authorized commuter record, said credit related to said passenger's debit.

24. A method of operating a transport network as claimed in claim 23 further including the step of identifying, by the computer, a second hub at which authorized commuters are taken on board vehicles to travel to the first hub.

25. A method of operating a transport network, as claimed in claim 24 further including the step of identifying, by the computer, at least one pick up point from which authorized commuters are transported to the second hub.

26. A method of operating a transport network, as claimed in claim 25 further including the step of identifying, by the computer, at least one pick up point from which authorized commuters are transported to the vehicle park.

* * * * *